June 11, 1968  H. M. POLLAK ETAL  3,387,636
RADIAL ARM SAW SUPPORT STRUCTURE
Filed Jan. 18, 1966  2 Sheets-Sheet 1

INVENTORS.
HENRY M. POLLAK
BY ROBERT S. POLLAK

Seidel & Gonda

ATTORNEYS.

June 11, 1968     H. M. POLLAK ET AL     3,387,636
RADIAL ARM SAW SUPPORT STRUCTURE
Filed Jan. 18, 1966     2 Sheets-Sheet 2
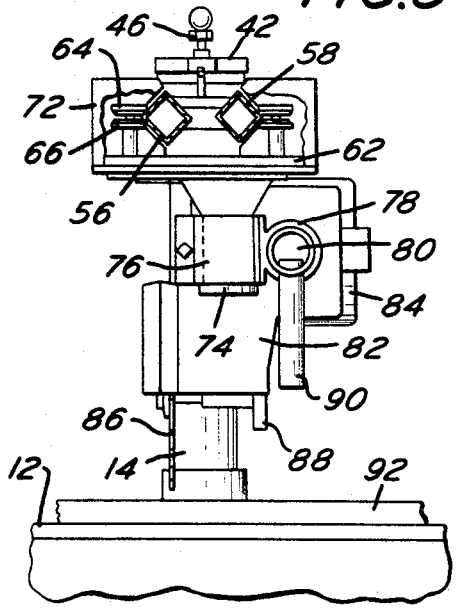
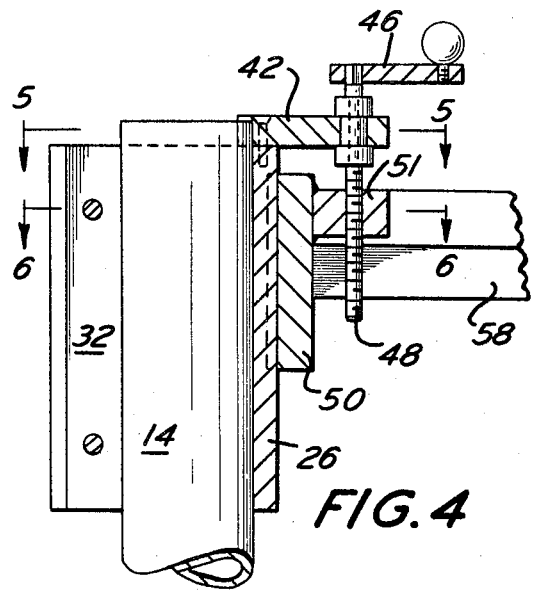
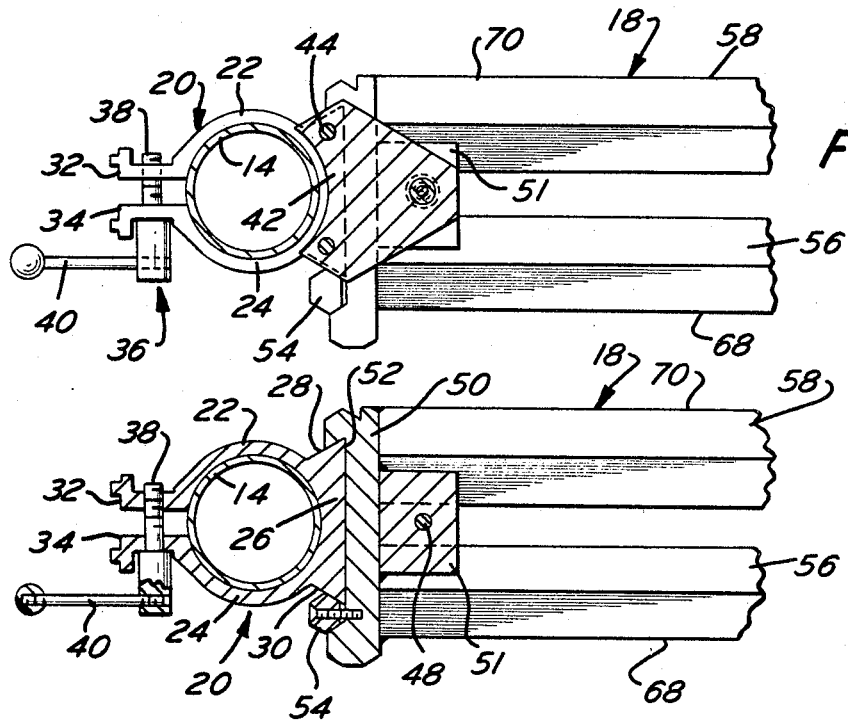
INVENTORS
HENRY M. POLLAK
ROBERT S. POLLAK
BY
Seidel & Gonda
ATTORNEYS.

United States Patent Office 3,387,636
Patented June 11, 1968

3,387,636
RADIAL ARM SAW SUPPORT STRUCTURE
Henry M. Pollak, 1235 Queen St., and Robert S. Pollak, 1007 N. Warren St., both of Pottstown, Pa. 19464
Filed Jan. 18, 1966, Ser. No. 521,388
3 Claims. (Cl. 143—6)

ABSTRACT OF THE DISCLOSURE

A radial arm saw is supported from a column by a clamp in the form of a substantially closed loop. The clamp is made from a ductile material and is split so as to have an opening defined between arms. The body portion of the clamp has a height substantially greater than the diameter of the column. The clamp includes a key portion which is on the opposite side from the arms. The arms are connected to the key portion by segments of uniform width which in turn are narrower than the key portion. The clamp is structurally interrelated in a manner so that it may be extruded. Any out-of-round surfaces on the tubing will not interfere with the clamping action and will be accommodated by deflection of the segments of the clamp.

---

This invention relates to radial arm saw support structure. More particularly, this invention relates to the structure supporting a radial arm saw.

The present invention concerns a radial arm saw and in particular the mechanism that permits the track on which the blade and its driving mechanism ride to be positioned relative to the work piece. In this manner, the saw will have the ability to cut the work piece at a multiplicity of angles and at a multiplicity of depths of cut. The angle referred to is the angle relative to the length of the work piece and not the angle achieved by tilting the blade so that the axis of the blade is not parallel to the table or work piece supporting surface. The angle of the axis of the blade may be referred to hereinafter as the tilt angle. The angle relative to the length dimension of the work piece may hereinafter be referred to as the miter angle.

The structure of a radial arm saw must be relatively rigid due to the fact that the track must resist deflection as much as possible. Deflection of the track in the horizontal plane will permit the blade to cut in a direction other than the desired direction. Deflection of the track in the vertical plane will permit the blade to climb up on the work piece rather than cut it. Further, the tendency for the blade to climb up on the work piece causes the blade and its driving mechanism to stall much more easily when the track deflects in the vertical plane.

In the design of a radial arm saw, the above problems are normally avoided by insuring (1) that the structural members themselves are stiff enough to resist deflection to a degree acceptable for the machine, and (2) that the connections joining the structural members are such that deflection is resisted satisfactorily at these points. No further explanation for point 1 is deemed necessary. With respect to point 2, the following movements must be provided if the saw is to make the four basic cuts (rip cut, cross cut, angle cut, miter cut):

(a) The blade must raise and lower. This is necessary in order that the variable depths of cut can be achieved and also in order that the blade can be positioned after rotating it to an angle or in the process of rotating it to an angle.

(b) The track must rotate about an axis perpendicular to the table surface to permit miter cuts.

(c) The blade must rotate about an axis perpendicular to the cutting rotation axis and parallel to the track axis in order to permit angle cuts.

(d) The blade must rotate about an axis perpendicular to both the blade cutting rotation axis and the track axis in order to position the blade for rip cuts.

In present machines on the market, various methods are employed to insure minimum deflection of structural components at the movable joints. Common to all of the designs is the locking of structural members in a manner so that relatively large contact surfaces of the structural members are fitted against one another to avoid loading at signal points or lines of contact. Line or point contact of loading members causes high stress concentrations at these points and resultant deflection of the structural members.

On machines commercially proposed heretofore, the motion described at (a) above is obtained by means of a vertical support tube or member between the track and the base of the machine. The vertical support tube is machined to an accurately sized diameter. A holding member also having an accurately sized inner diameter is telescopically supported by the tube for up and down sliding motion. Often, a gib is provided to remove the final .001 inch clearance between these two members. In addition, some method of keying is provided to prevent rotating motion of the support tube with respect to the base supporting the same.

The movement described in (b) above is obtained on commercial machines by devices similar to those described above with respect to (a). In other designs, a third member is provided between the track and the tube also requiring a close fit between machined surfaces. The motions described in (c) and (d) above are normally obtained by a combination of pins and locks. These motions are provided between the blade carrying carriage and the blade itself.

In the present invention, motions (a) and (b) are obtained by one integral mechanism and motions (c) and (d) are obtained by a second mechanism. In accordance with the present invention, a radial arm saw is supported from a column by a clamp in the form of a substantially closed loop. Said clamp is made from a ductile material and is split so as to have an opening defined between arms. The clamp includes a key portion which is on the opposite side from the arms. The clamp is longer than its transverse dimensions. The arm are connected to the key portion by segments of uniform width which in turn are narrower than the key portion. The clamp is structurally interrelated in a manner so that it may be extruded.

The clamp will not require any machined surfaces on it and can be utilized with commercially available tubing. Due to the ductility of the clamp, and its structural interrelationship, substantially one hundred percent of the inner peripheral surface of the clamp will be in contact with the outer periphery of the column made from commercially available tubing. Any out-of-round surfaces on the tubing will not interfere with the clamping action and will be accommodated by deflection of the segments of the clamp.

In accordance with the present invention, motion (a) is obtained by a dovetail slide type mechanism. The above-mentioned key portion on the clamp forms a part of this mechanism. The track is fixedly secured to one-half of the dovetail mechanism (male or female portion) and supported thereby as a cantilever arm. A screw feed mechanism is provided to attain up and down relative movement between the track and the column.

Motion (c) and (d) are obtained by a clamp device similar to that described above. The clamp device is likewise structurally interrelated in a manner whereby it can be extruded and used with commercially available tubing which does not require any machining. In a preferred embodiment, this clamp device includes a pair of clamps connected back to back and rotated ninety degrees with respect to each other.

It is an object of the present invention to provide a radial arm saw support clamp structurally interrelated in a manner so that it may be of ductile metal, thereby producing a machine which is less expensive to manufacture yet has all the qualities of a machined structure.

It is another object of the present invention to provide a clamp to be utilized in conjunction with commercially available tubing without requiring machining and support a radial arm saw.

It is another object of the present invention to provide a radial arm saw support structure which will enable a saw to be constructed more inexpensively than those proposed heretofore by using commercially available tubing.

Other objects will appear hereinafter.

For the purpose of illustrating the invention, there is shown in the drawings a form which is presently preferred; it being understood, however, that this invention is not limited to the precise arrangements and instrumentalities shown.

FIGURE 3 is a view taken along the line 3—3 in FIGURE 1.

FIGURE 4 is a sectional view taken along the line 4—4 in FIGURE 2.

FIGURE 5 is a sectional view taken along the line 5—5 in FIGURE 4.

FIGURE 6 is a sectional view taken along the line 6—6 in FIGURE 4.

Figure 1:
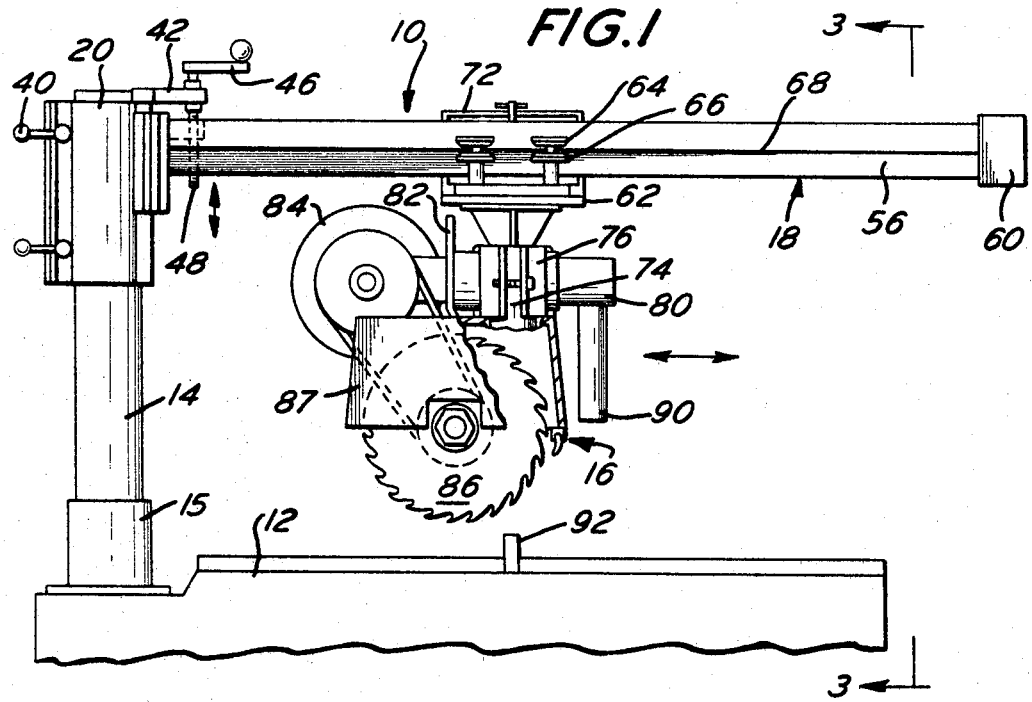
FIGURE 1 is a side elevation view of the radial arm saw.

Referring to the drawing in detail, wherein like numerals indicate like elements, there is shown in FIGURE 1 a radial arm saw designated generally as 10 and including a table 12.

The saw 10 includes a column 14 supported at its lower end by a base 15. Column 14 should be substantially circular and is preferably a commercially available tubing. A saw designated generally as 16 is supported by a track 18. Track 18 is supported as a cantilever arm from the column 14 by structure to be described in detail hereinafter.

A clamp 20 is provided. Clamp 20 is a split clamp which is in the form of a substantially closed loop. Clamp 20 is structurally interrelated in a manner so that it may be extruded and preferably is made from a ductile material such as aluminum.

As shown more clearly in FIGURES 5 and 6, clamp 20 includes arcuate segments 22 and 24 on diametrically opposite sides of column 14. Segments 22 and 24 are of uniform width and embrace approximately 180° of the outer periphery of column 14. Clamp 20 also includes one-half of a dovetail slide mechanism such as the key portion 26. Portion 26 includes tapered side faces 28 and 30 which converge towards the column 14.

Clamp 20 includes arms 32 and 34 extending from the free ends of the segments 22 and 24, respectively, in a direction away from the portion 26. The arms 32 and 34 are at least as thick as the segments 22 and 24 which in turn are substantially thinner than the portion 26. The distance between the arms 32 and 34 corresponds to approximately twenty-five to thirty arcuate degrees on the outer periphery of column 14.

A latch means 36 is provided to releasably interconnect the arms 32 and 34. In the illustrated embodiment, the latch means includes a pair of threaded members 38, each having a handle 40 connected thereto. Rotation of the handle 40 in one direction will bring the arms 32 and 34 towards each other and in another direction will cause the arms to move away from each other. In the position illustrated in the drawings, the latch means 36 causes the arms 32 and 34 to be at their closest point so that clamp 20 is in engagement with the outer periphery of column 14. Due to the ductility of segments 22 and 24, intimate contact will be provided between the clamp 20 and column 14 regardless of the fact that the column 14 may be slightly out of round. A radially outwardly directed pin or flange may be fixed to column 14 to prevent clamp 20 from sliding down the column.

A mounting plate 42 is fixedly secured to the upper end of portion 26 by means of screws 44 or the like. If desired, plate 42 could be welded to the upper end of portion 26. An adjusting handle 46 is connected to one end of a threaded member 48. Intermediate its ends, member 48 is coupled to the plate 42 by means of a conventional non-rising coupling. Member 48 is threadedly coupled to a mounting block 51. Mounting block 51 is fixedly secured, such as by welding, to one face of a slide plate 50. Slide plate 50 has a keyway 52 on its opposite face and forms the female half of the dovetail slide mechanism.

A gib 54 is adjustably supported by the slide plate 50. Gib 54 is hexagonal in cross section as illustrated more clearly in FIGURE 6 and has one face overlying and in contact with face 30. Adjustability of gib 54 may be provided by bolts threadedly coupled to the plate 50 with shims disposed therebetween and surrounding the bolts. In this manner, an accurate machined fit between the male and female components of the dovetail mechanism need not be provided. In a preferred embodiment, the components of the dovetail mechanism are extruded components of uniform cross section, or designed so that the member before machining or secondary operation is of uniform cross section.

The track 18 includes first and second tubes 56 and 58 supported as cantilever arms from the side plate 50. Tubes 56 and 58 are commercially available tubes and are preferably rectangular or triangular in cross section. One end of tubes 56 and 58 is welded or otherwise fixedly secured to mounting block 51.

Figure 2:
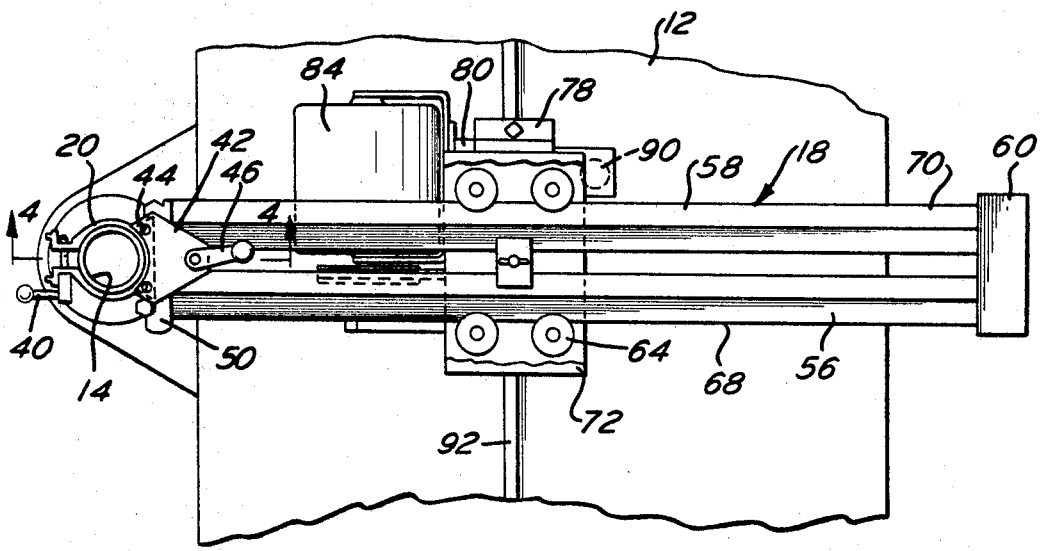
FIGURE 2 is a top plan view of the saw illustrated in FIGURE 1.

The ends of the tubes 56 and 58 remote from the plate 50 are connected together by a head 60. A carriage 62 is mounted for reciprocation along the track 18. As shown more clearly in FIGURES 2 and 3, the carriage 62 is provided with sets of wheels in rolling engagement with tube 56 and sets of wheels in rolling engagement with the tube 58. Since the sets of wheels are identical, only one set will be described in detail. Each set of wheels includes an upper wheel 64 and a lower wheel 66 mounted for rotation about a vertical axis. The tube 56 is positioned so that one of its corners, namely corner 68, is disposed between the wheels 64 and 66. Likewise, a corner 70 on the tube 58 is disposed between the upper and lower wheels of each set of wheels associated therewith. A housing 72 s provided on the carriage for enclosing the sets of wheels.

A post 74 depends from the carriage 62. A clamp 76, similar to clamp 20, is disposed around post 74. Another clamp 78, identical with clamp 76, is secured to clamp 76. The longitudinal axis of clamp 76 is vertical. The longitudinal axis of clamp 78 is horizontal. Clamp 78 is fixedly secured to clamp 76 by screws, bolts, and the like.

Clamp 78 extends around a hollow post 80. One end of post 80 is connected to a bracket 82. Bracket 82 supports a motor 84. Motor 84 is coupled by means of a belt, chain or the like to a saw blade 86. Saw blade 86 rotates about an axis perpendicular to the longitudinal axes of tubes 56 and 58, is protected by guard 87, and is supported by a housing 88. Housing 88 in turn is supported by bracket 82. A handle 90, in the form of a hollow pipe, has one end fixedly secured to the hollow post 80.

A conventional rip fence 92 is supported by the table 12.

The carriage 62 and all components supported therefrom including the saw blade 86 are mounted for reciprocation along the track 18. Such reciprocation may be effected by manually moving the handle 90 in a direction parallel to the longitudinal axis of tubes 56 and 58. A bevel or angle cross-cut may be obtained by tilting the saw blade 86 to the precise desired angle. This is accomplished by rotating the post 80 about its longitudinal axis as effected by moving the handle 90 to accomplish the same.

By unloosening the clamp 20, the track 18 may be rotated with respect to column 14 to any desired position. This will permit the saw blade 86 to make miter cuts. By adjusting handle 46, the blade 86 may be raised or lowered as desired. Blade 86 may be rotated through a complete 360° about the longitudinal axis of post 74. Blade 86 may also be rotated through an arc of 90° about the longitudinal axis of post 80, 45° on each side of the vertical.

When constructed in the manner as described above, the saw 10 may be manufactured more economically than those proposed heretofore while having all the structural requirements of such saws and providing the accuracy and tolerances acceptable to the trade.

The present invention may be embodied in other specific forms without departing from the spirit or essential attributes thereof and, accordingly, reference should be made to the appended claims, rather than to the foregoing specification as indicating the scope of the invention.

We claim:
1. In a radial arm saw having a base, a column extending from said base, and at least one arm for supporting a saw, means for coupling said arm to said column comprising a split clamp, said clamp being made from an extruded ductile metal whereby said clamp may conform and be in intimate contact with the outer surface of said column, said clamp having a dovetail portion integral therewith opposite the opening defined by the split, said clamp having a body portion having a height substantially greater than the diameter of said column, arms integral with said body portion extending outwardly at the split in a direction away from said dovetail portion, arcuate segments connecting each arm to a part of the dovetail portion, the thickness of the dovetail portion being greater than the thickness of the segments, upper and lower means interconnecting the arms and moving the same in a general direction toward and away from each other, said dovetail portion being a key portion, a slide plate having a keyway receiving said key portion, a gib in engagement with the side face of the key portion, said gib being adapted to be connected to said slide plate and being movable into various discrete positions for securely engaging said key portion, and means for vertically moving said slide plate with respect to said key portion.

2. In a radial arm saw as set forth in claim 1 wherein two arms are provided for supporting the saw, said arms including parallel hollow tubes having at least three discrete sides, each tube having a corner horizontally disposed and lying between its uppermost and lowermost edges.

3. In a radial arm saw as set forth in claim 1, said means for vertically moving said slide plate with respect to said key portion including a threaded member threadedly coupled to said slide plate to effect movement thereof.

References Cited
UNITED STATES PATENTS

| | | | |
|---|---|---|---|
| 1,853,891 | 4/1932 | Birkenmaier | 24—115 |
| 2,291,999 | 8/1942 | Wilson et al. | |
| 2,489,420 | 11/1949 | Kirk et al. | 143—6 |
| 2,525,712 | 10/1950 | Neighbour | 143—47 |
| 2,895,002 | 7/1959 | Dupre et al. | 24—123 |
| 3,294,129 | 12/1966 | Kohler et al. | 143—6 |

DONALD R. SCHRAN, *Primary Examiner.*